(12) United States Patent　　(10) Patent No.: US 11,009,011 B2
Groenheden　　(45) Date of Patent: May 18, 2021

(54) COOLING ARRANGEMENT FOR A WIND TURBINE

(71) Applicant: Siemens Gamesa Renewable Energy A/S, Brande (DK)

(72) Inventor: Ebbe Groenheden, Horsens (DK)

(73) Assignee: SIEMENS GAMESA RENEWABLE ENERGY, Brande (DK)

( * ) Notice: Subject to any disclaimer, the term of this patent is extended or adjusted under 35 U.S.C. 154(b) by 0 days.

(21) Appl. No.: 16/839,909

(22) Filed: Apr. 3, 2020

(65) Prior Publication Data

US 2020/0318620 A1　　Oct. 8, 2020

(30) Foreign Application Priority Data

Apr. 5, 2019　(EP) ..................................... 19167476

(51) Int. Cl.
*F03D 80/60*　　(2016.01)
*F03D 80/80*　　(2016.01)

(52) U.S. Cl.
CPC ............. *F03D 80/60* (2016.05); *F03D 80/80* (2016.05); *F05B 2240/14* (2013.01); *F05B 2260/64* (2013.01)

(58) Field of Classification Search
CPC ...... F03D 80/60; F03D 80/80; F05B 2240/14; F05B 2260/64
USPC .............................................. 290/1 B, 44, 55
See application file for complete search history.

(56) References Cited

U.S. PATENT DOCUMENTS

| | | | | |
|---|---|---|---|---|
| 6,676,122 | B1 * | 1/2004 | Wobben ................. | F03D 80/60 290/55 |
| 7,057,305 | B2 * | 6/2006 | Kruger-Gotzmann .... | F03D 9/25 290/55 |
| 7,161,260 | B2 * | 1/2007 | Kruger-Gotzmann .... | F03D 9/25 290/55 |
| 7,843,080 | B2 * | 11/2010 | Jansen .................... | F03D 15/10 290/55 |
| 8,047,774 | B2 * | 11/2011 | Bagepalli ............. | H02K 7/1823 415/176 |

(Continued)

FOREIGN PATENT DOCUMENTS

EP　　　　2365217 A1　　9/2011
WO　　2018197058 A1　　11/2018

OTHER PUBLICATIONS

Extended European Search Report in related European Patent Application No. 19167476.1, dated Oct. 4, 2019. 7 pages.

*Primary Examiner* — Pedro J Cuevas
(74) *Attorney, Agent, or Firm* — Schmeiser, Olsen & Watts LLP

(57) ABSTRACT

A nacelle for a wind turbine extends along a longitudinal axis between a front side where a wind rotor is rotatably attachable to the nacelle for rotating about the longitudinal axis and a longitudinally opposite rear side is provided. The nacelle includes an outer surface delimiting an inner volume of the nacelle, a cooling path for circulating a cooling flow in the inner volume. The nacelle further includes a pressure source for generating an overpressure inside the inner volume of the nacelle, the pressure source including an inlet at the outer surface for receiving the cooling flow and an outlet for delivering the cooling flow in the inner volume, at least one heat exchanger provided in the outer surface for receiving the cooling flow from the inner volume.

8 Claims, 2 Drawing Sheets

(56) References Cited

U.S. PATENT DOCUMENTS

| | | | | |
|---|---|---|---|---|
| 8,053,918 B2* | 11/2011 | Wobben | | F03D 9/25 290/55 |
| 8,109,814 B2* | 2/2012 | Uchino | | F03D 80/60 454/184 |
| 8,308,434 B2* | 11/2012 | Numajiri | | F03D 80/60 416/95 |
| 8,360,715 B2* | 1/2013 | Matsuo | | F03D 80/60 415/176 |
| 8,476,784 B2* | 7/2013 | Sato | | F03D 1/0675 290/55 |
| 8,941,257 B2* | 1/2015 | Iwata | | F03D 80/60 290/55 |
| 8,992,170 B2* | 3/2015 | Stiesdal | | F03D 80/60 415/176 |
| 9,209,665 B2* | 12/2015 | Casazza | | H02K 1/2773 |
| 9,273,670 B2* | 3/2016 | Li | | F03D 7/0272 |
| 9,624,908 B2* | 4/2017 | Airoldi | | H02K 7/1838 |
| 10,359,028 B2* | 7/2019 | Ma | | H02K 7/1838 |
| 2005/0167989 A1* | 8/2005 | Kruger-Gotzmann | | F03D 80/40 290/55 |
| 2007/0222223 A1* | 9/2007 | Bagepalli | | F03D 9/25 290/55 |
| 2008/0197638 A1* | 8/2008 | Wobben | | F03D 80/50 290/55 |
| 2009/0060748 A1* | 3/2009 | Landa | | F03D 80/60 416/93 R |
| 2010/0061853 A1* | 3/2010 | Bagepalli | | H02K 15/125 416/95 |
| 2010/0127502 A1* | 5/2010 | Uchino | | F03D 80/60 290/55 |
| 2010/0140952 A1* | 6/2010 | Jansen | | F03D 80/60 290/55 |
| 2010/0148514 A1* | 6/2010 | Sato | | F03D 80/60 290/55 |
| 2010/0164228 A1 | 7/2010 | Matsuo et al. | | |
| 2010/0176600 A1* | 7/2010 | Pabst | | H02K 5/18 290/55 |
| 2011/0163545 A1* | 7/2011 | Hirai | | B01D 46/0086 290/44 |
| 2011/0204652 A1 | 8/2011 | Sato et al. | | |
| 2011/0241353 A1* | 10/2011 | Numajiri | | F03D 9/25 290/1 B |
| 2012/0025541 A1* | 2/2012 | Hirai | | F03D 80/60 290/55 |
| 2012/0032449 A1* | 2/2012 | Wobben | | F03D 9/25 290/1 B |
| 2012/0074709 A1* | 3/2012 | Cole | | H02K 9/08 290/55 |
| 2012/0074711 A1* | 3/2012 | Sato | | F03D 1/0675 290/55 |
| 2012/0148407 A1* | 6/2012 | Akashi | | F03D 9/28 416/95 |
| 2012/0156053 A1* | 6/2012 | Stiesdal | | F03D 80/60 416/93 R |
| 2012/0205998 A1* | 8/2012 | Seibicke | | F03D 80/60 310/64 |
| 2012/0235419 A1* | 9/2012 | Huang | | F03D 9/25 290/55 |
| 2012/0280511 A1* | 11/2012 | Eriksen | | F16C 37/007 290/55 |
| 2013/0015665 A1* | 1/2013 | Wang | | F03D 80/60 290/55 |
| 2013/0056989 A1* | 3/2013 | Sabhapathy | | F03D 80/60 290/55 |
| 2013/0270825 A1* | 10/2013 | Iwata | | F03D 9/25 290/44 |
| 2014/0054897 A1* | 2/2014 | Casazza | | H02K 1/32 290/55 |
| 2014/0346781 A1* | 11/2014 | Airoldi | | H02K 7/1838 290/1 B |
| 2015/0381013 A1* | 12/2015 | Davies | | F01D 5/10 290/52 |
| 2016/0084226 A1* | 3/2016 | Eriksen | | H02K 7/18 290/55 |
| 2018/0038351 A1* | 2/2018 | Jacobsen | | F03D 80/60 |
| 2018/0080435 A1* | 3/2018 | Ma | | F03D 9/25 |
| 2019/0140518 A1* | 5/2019 | Groenheden | | F03D 80/80 |
| 2020/0011303 A1* | 1/2020 | Airoldi | | F03D 80/80 |
| 2021/0010455 A1* | 1/2021 | Hussain | | F03D 80/70 |

\* cited by examiner

COOLING ARRANGEMENT FOR A WIND TURBINE

CROSS-REFERENCE TO RELATED APPLICATIONS

This application claims priority to European Patent Application No. 19167476.1, having a filing date of Apr. 5, 2019, the entire contents of which are hereby incorporated by reference.

FIELD OF TECHNOLOGY

The following relates to a cooling arrangement installed on the nacelle of a wind turbine.

BACKGROUND

A plurality of solutions is known for providing a cooling path inside a nacelle of a wind turbine. For example a heat exchanger may be positioned behind a fan with an exhaust duct and a silencer to mitigate the fan noise. A cooling device of this type is typically located inside the nacelle, drawing air through a central grate or filter, thus creating an under pressure inside the nacelle. Alternatively, a liquid cooling path may be provided, which comprises a passive heat exchanger installed on an external surface of the nacelle. Combinations of the two above described concepts have also been proposed.

Both solutions present drawbacks. The exhaust ducts of the first solution require space for proper ducting and fan noise could become a problem. The passive heat exchanger of the second solution is rather large, needs safety structures for external service and maintenance and must be able to withstand wind loads. The cooling is also dependent on the wind speed, so the improvement in cooling above rated power cannot be utilized properly.

Therefore, there is a need to provide a cooling arrangement to be installed on a nacelle of a wind turbine, in order to overcome the above-mentioned drawbacks.

SUMMARY

According to the embodiment of the present invention there is provided a nacelle for a wind turbine extending along a longitudinal axis between a front side, where a wind rotor is rotatably attachable to the nacelle for rotating about the longitudinal axis, and a longitudinally opposite rear side. The nacelle comprises:
an outer surface delimiting an inner volume of the nacelle,
a cooling path for circulating a cooling flow in the inner volume,
wherein the nacelle further comprises:
pressure source for generating an overpressure inside the inner volume of the nacelle, the pressure source including an inlet at the outer surface for receiving the cooling flow and an outlet for delivering the cooling flow in the inner volume,
at least one heat exchanger provided in the outer surface for receiving the cooling flow from the inner volume.

Advantageously, the embodiment of the present invention provides a centralized pressure source for providing the cooling flow in the inner volume of the nacelle. The pressure source may be provided at the front side of the nacelle, i.e. where more space is available.

By generating an overpressure inside the nacelle, each designed opening in the nacelle, such as a heat exchanger located in the nacelle outer surface, is cooled by the cooling flow forced out by the overpressure inside the nacelle. By having a centralized pressure source, noise is kept inside the nacelle. Consequently, each exit with a heat exchanger does not need a silencer with the associated ducting. Pressurizing the nacelle also guarantees that the cooling flow coming into the system is treated as designed in the centralized pressure source.

The pressure source provides the components inside the nacelle with their cooling air demand. The components inside the nacelle may include a direct cooled electrical generator, i.e. a generator not including a heat exchanger, provided along the cooling path for receiving the cooling flow. Heat exchangers are provided in the outer surface of the nacelle, saving space in the overall nacelle design. The heat exchanger receives the cooling flow from the inner volume and delivers a heated flow to the ambient environment surrounding the nacelle. The cooling flow may be used inside the heat exchanger for cooling an operating fluid, to be used for cooling purposes in a cooling circuit inside the nacelle. The heat exchanger may include a regulation valve for limiting the cooling flow from the inside to the outside.

According to embodiments of the present invention, the nacelle includes a plurality of heat exchanger, for example one heat exchanger having oil as operating fluid and a second heat exchanger having glycol as operating fluid.

The physical size needed to cool a heat exchanger with this design is reduced. Design flexibility is increased as there is no need for additional ducting and fans associated with a heat exchanger, as this is provided by the central air source using the nacelle room as cooling flow path. Combining all cooling flows for heat exchangers and the generator inside the nacelle, heat rejection from electrical cabinets has a minimal impact, as their heat loss is relatively small compared to the total system flow capacity. This also minimizes local hotspot zones with poor change of air simply due to the magnitude of the total shared air flow. All component and cooling system service can be done by operators staying inside the nacelle, thus improving security.

According to embodiments of the present invention, the nacelle includes a plurality of components housed in the inner volume and the cooling path comprises at least one adjustment valve for controlling the temperature at a respective component of the plurality of components in the inner volume. Each component inside the nacelle may have a local adjustment valve to control local temperature through throttling of the cooling flow.

The pressure source may include one or more fan for generating the cooling flow in the cooling path. According to embodiments of the present invention, the pressure source may be equipped with air treatment capabilities, such as filtration and a mist eliminator, thus making sure the air entering the nacelle is clean and water droplets are removed.

The aspects defined above and further aspects of the present invention are apparent from the examples of embodiment to be described hereinafter and are explained with reference to such examples of embodiment. The embodiment of the present invention will be described in more detail hereinafter with reference to examples of embodiment but to which the present invention is not limited.

BRIEF DESCRIPTION

Some of the embodiments will be described in detail, with reference to the following figures, wherein like designations denote like members, wherein.

DETAILED DESCRIPTION

The drawings are in schematic form. Similar or identical elements are referenced by the same or different reference signs.

Figure 1:
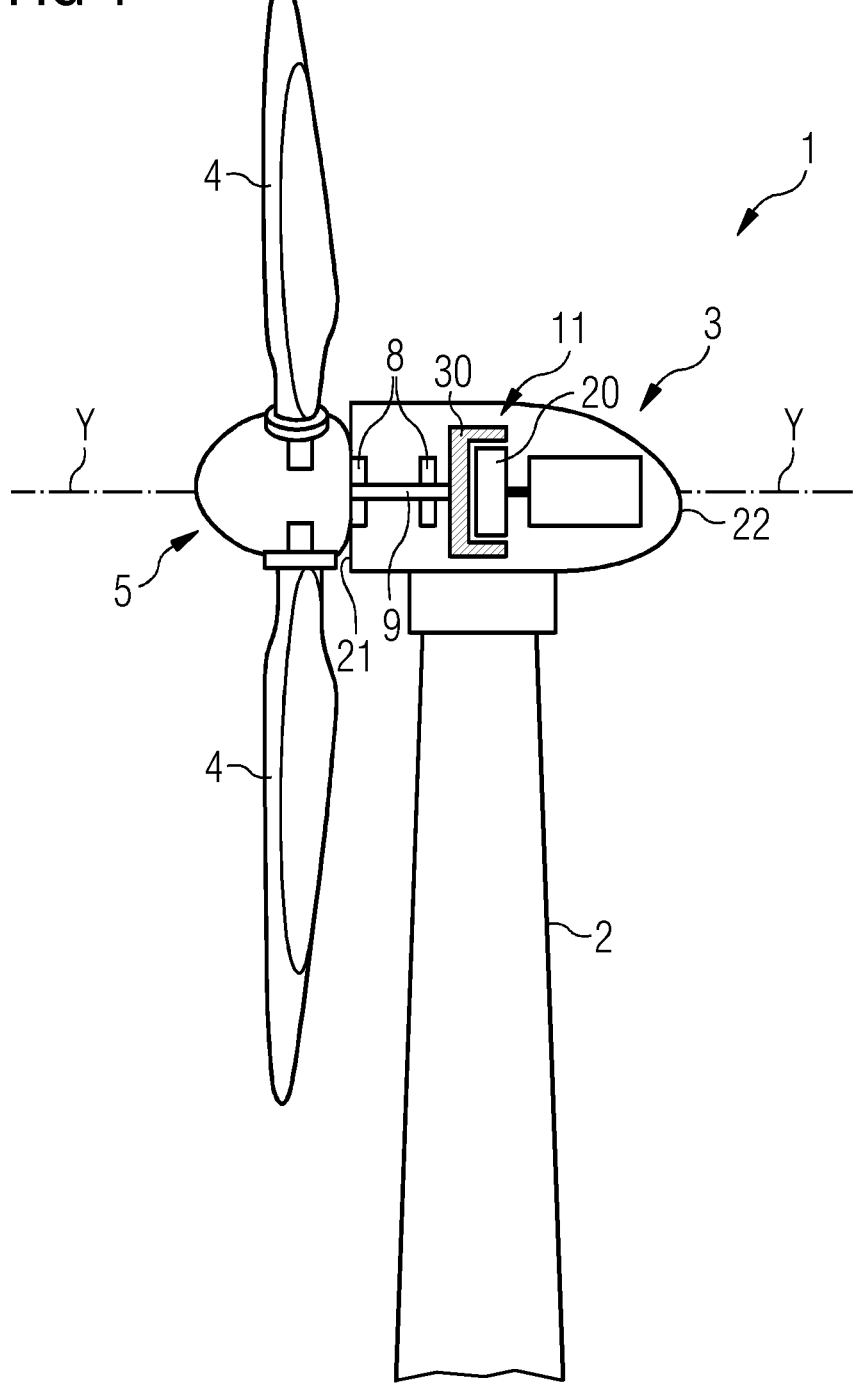
FIG. 1 depicts a lateral view of a wind turbine including a nacelle.

FIG. 1 shows a wind turbine 1 according to the embodiment of the present invention. The wind turbine 1 comprises a tower 2, which is mounted on a non-depicted fundament. A nacelle 3 is arranged on top of the tower 2, in order to be rotatable about a yaw axis substantially perpendicular to the ground. The wind turbine 1 further comprises a wind rotor 5 having two, three or more blades 4 (in the perspective of FIG. 1 only two blades 4 are visible). The wind rotor 5 is rotatable around a rotational axis Y. The wind rotor 5 further includes a hub rotatably attached to the nacelle 3 for rotating about the longitudinal axis Y and a spinner covering the hub. The blades 4 extend radially with respect to the rotational axis Y. The nacelle 3 extends along the longitudinal axis Y between a front side 21 where the wind rotor 5 is attached to the nacelle 3 and a longitudinally opposite rear side 22.

Figure 2:
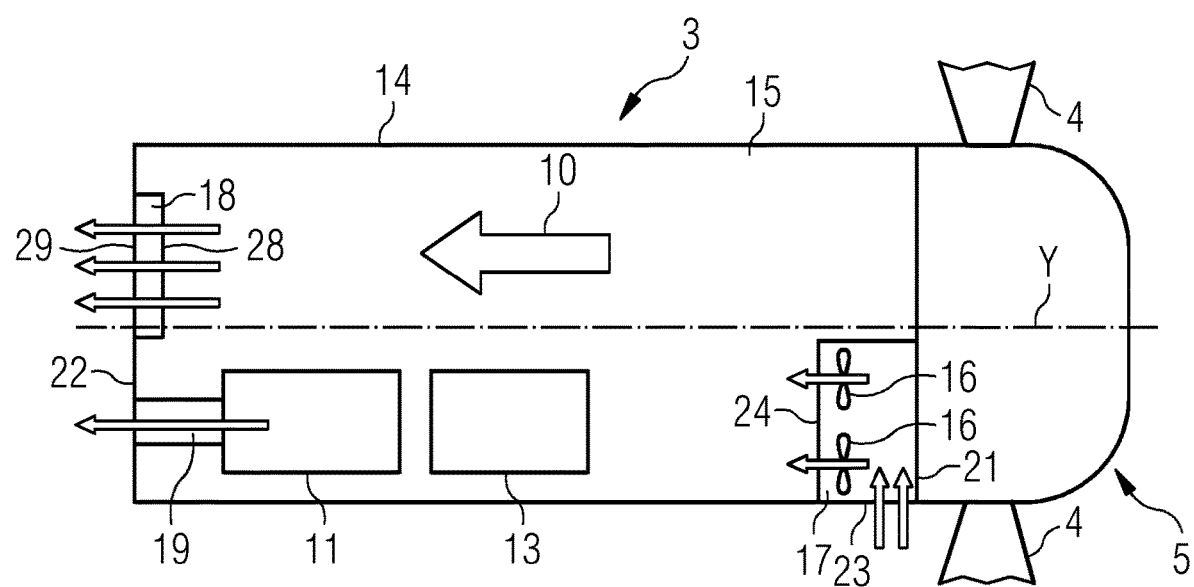
FIG. 2 depicts a schematic sectional view of a nacelle having a cooling arrangement.

The wind turbine 1 comprises an electric generator 11. The wind rotor 5 is rotationally coupled with the electric generator 11 by means of a rotatable main shaft 9 and a gearbox (not represented in FIG. 1). According to other possible embodiments of the present invention (not represented in the attached figures), the wind rotor 5 is rotationally coupled directly with the electric generator 11 (direct-drive generator configuration). The electrical generator 11 is of the direct cooled type, an exhaust duct 19 (as shown in FIG. 2) being connected between the electrical generator 11 and outer surface 14 of the nacelle 3. The exhaust duct 19 is provided between the electrical generator 11 and the rear side 22 of the nacelle 3. A schematically depicted bearing assembly 8 is provided in order to hold in place the rotor 5. The rotatable main shaft 9 extends along the rotational axis Y. The electric generator 11 includes a stator 20 and a rotor 30. The rotor 30 is radially external to the stator 20 and is rotatable with respect to the stator 20 about the rotational axis Y. According to another embodiment of the present invention (not shown), the rotor is radially internal to the stator and is rotatable with respect to the stator about the rotational axis Y FIG. 2 shows a schematic sectional view of the nacelle 5. The nacelle 3 comprises an outer surface 14 delimiting an inner volume 15 of the nacelle 3. The inner volume 15 houses a plurality of components, including the electrical generator 11. The inner volume 15 further houses an electric cabinet 13. Inside the inner volume 15 a cooling path (schematically represented by an arrow 10 in FIG. 2) is provided for circulating a cooling flow in the inner volume 15. The cooling flow is constituted by a flow of air from the ambient environment surrounding the nacelle 3, outside the outer surface 14. The cooling path 10 is oriented from the front side 21 to the rear side of the nacelle 3. The electrical generator 11 is provided along the cooling path 10 for receiving the cooling flow. The cooling path 10 includes a pressure source 17 for generating an overpressure inside the inner volume 15 of the nacelle 3. The pressure source 17 is provided at the front side 21 of the nacelle 3. The pressure source 17 includes an inlet 23 at the outer surface 14 for receiving the cooling flow from the ambient environment and an outlet 23 for delivering the cooling flow in the inner volume 15. The pressure source 17 creates an overpressure inside the inner volume 15, excluding the portion of the inner volume, which is occupied by the pressure source 17. Inside the pressure source 17, between the inlet 23 and the outlet 24, an under pressure is established. For generating the cooling flow in inner volume 15, the pressure source 17 comprises one or more fans 16 (two fans are shown in the embodiment of FIG. 2).

According to embodiment of the present invention, the pressure source 17 may comprise a filter (not shown in the embodiment of FIG. 2) and/or a mist eliminator (not shown in the embodiment of FIG. 2) and/or other air treatment components such as, but not limited to, a pre-heater.

The cooling flow generated in inner volume 15 receives heat from the components installed inside the nacelle 2, in particular from the electrical generator 11. One or more adjustment valves (not shown in the embodiment of FIG. 2) may be respectively provided in the plurality of components 11, 13 inside the inner volume 15 for controlling the cooling flow and consequently the temperature at the respective component 11, 13.

The nacelle 3 includes a heat exchanger 18 provided in the outer surface 14 at the rear side 22 for receiving the cooling flow from the inner volume 15. Inside the heat exchanger 18 an operating fluid is circulated, which is cooled by cooling flow from the inner volume 15 and which is provided a cooling circuit inside the nacelle. Consequently, the cooling flow from the inner volume 15 is heated inside heat exchanger 18. The heat exchanger 18 includes an inner surface 28 toward the inner volume 15 for receiving the cooling flow from the inner volume 15. The heat exchanger 18 includes an outer surface 29 for delivering the heated flow to the ambient environment outside the nacelle 3. The heat exchanger 18 optionally includes a regulation valve (not shown in the attached figures) for limiting the cooling flow from the inside to the outside.

According to embodiments of the present invention (not shown), a plurality of heat exchanger are present. In particular, according to one embodiment of the present invention, two heat exchangers are present: one heat having oil as operating fluid and a second one having glycol as operating fluid.

According to embodiments of the present invention (not shown), the heat exchanger(s) may be provided at a lateral side of the nacelle 3, between the front side 21 and the rear side 22.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A nacelle for a wind turbine extending along a longitudinal axis between a front side where a wind rotor is rotatably attachable to the nacelle for rotating about the longitudinal axis and a longitudinally opposite rear side, the nacelle comprising:

an outer surface delimiting an inner volume of the nacelle;
a cooling path for circulating a cooling flow in the inner volume;
a pressure source for generating an overpressure inside the inner volume of the nacelle, the pressure source including an inlet at the outer surface for receiving the cooling flow and an outlet for delivering the cooling flow in the inner volume; and at least one heat exchanger disposed within the inner volume of the nacelle against the outer surface for receiving the cooling flow from the inner volume;

wherein the at least one heat exchanger includes an inner surface receiving the cooling flow from the inner volume and an outer surface for delivering a heated flow to an ambient environment surrounding the nacelle.

2. The nacelle according to claim 1, wherein the pressure source is provided at the front side of the nacelle.

3. The nacelle according to claim 1, further comprising an electrical generator provided along the cooling path for receiving the cooling flow.

4. The nacelle according to claim 3, wherein the electrical generator is a direct cooled, wherein an exhaust duct is connected between the electrical generator and outer surface of the nacelle.

5. The nacelle according to claim 4, wherein the exhaust duct is provided between the electrical generator and the rear side of the nacelle.

6. The nacelle according to claim 1, wherein the heat exchanger is provided at the rear side of the nacelle.

7. The nacelle according to claim 1, wherein the nacelle includes a plurality of components housed in the inner volume and the cooling path is configured to allow for control of a temperature at a respective component of the plurality of components in the inner volume.

8. A wind turbine including the nacelle according to claim 1.

* * * * *